(No Model.)
W. H. TUFTS.
FISH LINE SINKER.
No. 418,995. Patented Jan. 7, 1890.
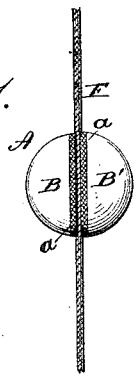
Fig. 1.
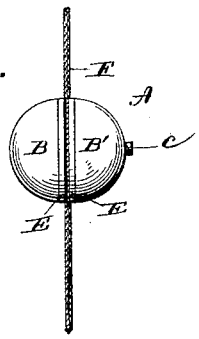
Fig. 2.
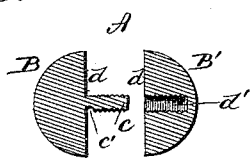
Fig. 3.
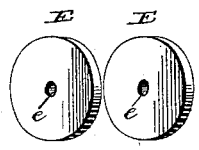
Fig. 4.
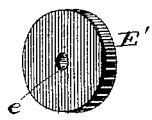
Fig. 5.
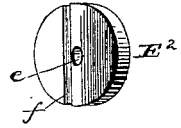
Fig. 6.
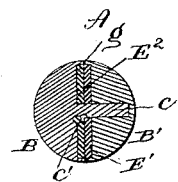
Fig. 7.
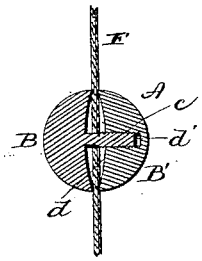
Fig. 8.
Fig. 9.
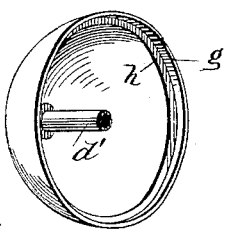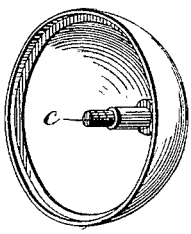
Witnesses
F. L. Ourand
J. Coleman
Inventor.
W. H. Tufts.
By —— Attorney.

UNITED STATES PATENT OFFICE.

WILLIAM H. TUFTS, OF WASHINGTON, DISTRICT OF COLUMBIA.

FISH-LINE SINKER.

SPECIFICATION forming part of Letters Patent No. 418,995, dated January 7, 1890.

Application filed August 13, 1887. Serial No. 246,904. (No model.)

*To all whom it may concern:*

Be it known that I, WILLIAM H. TUFTS, a citizen of the United States, residing in Washington, in the District of Columbia, have invented a new and useful Line-Sinker for Fishing and other Purposes, of which the following is a specification.

The object of my invention is to provide a sinker that can be put on a line quickly and securely without looping or tying it thereto; and it consists in the combination and arrangement of parts, as hereinafter more fully described, and pointed out in the claims.

In the accompanying drawings embodying my invention, like parts are indicated by like letters in the several figures.

Figure 1 is an exterior view of my sinker with the line attached. Fig. 2 is a modification of my invention, showing the sinker A on the line with the disks E E in position between the hemispheres; Fig. 3, a sectional view of the sinker shown at Fig. 1 with the parts B B' detached or separated. Fig. 4 illustrates in perspective perforated disks employed in the construction shown at Fig. 2. Fig. 5 represents a disk of soft rubber or other elastic material. Fig. 6 is a modification of the elastic disk shown at Fig. 5, provided with a groove for receiving the line. Fig. 7 shows in section the construction of the hemispheres when used in conjunction with the grooved disk shown at Fig. 6; Fig. 8, a sectional view of my sinker shown at Fig. 3, with the faces or planes of the parts B B' slightly concaved. Fig. 9 illustrates my invention, upon an enlarged scale, when constructed of suitable material for use as a float.

The hemisphere B has a threaded stem $c$, into which a suitable depression, as shown at $c'$, Fig. 3, is made. This depression permits the line to pass substantially to the center of the sinker, wherein it lies when the parts B B' have been closed down upon it. In some instances the depression may not extend entirely around the stem, and under certain conditions I may dispense with it altogether. The stem $c$ may also be constructed without the thread, and the parts B B' united by riveting or other suitable means; but I prefer the threaded stem and socket to any other.

The hemisphere B' is constructed with a threaded socket $d'$ to receive the stem $c$. When this hemisphere B' has been screwed or turned down to meet the opposite part B, the sinker will be firmly held in place by frictional contact with the line.

To facilitate the manipulation of the parts B B', I preferably mill or otherwise roughen the exterior surface, Fig. 1, $a$.

When light sinkers only are required, the use of the disks may be dispensed with and the hemispheres B B' used without them, in which case the stem need only penetrate the socket sufficiently to permit the two parts B B', Fig. 3, to close together. When the disks E are used, however, it will be necessary to have a longer stem, in which case an aperture would be required to allow the stem to pass through $c$, Fig. 2.

In Fig. 8 the opposing faces $dd$ of the hemispheres are shown concaved, in order the better to impinge upon the line. The disks may also be concaved when found desirable. These disks must have apertures $e$ corresponding to the diameter of the stem $c$, and are used to increase or diminish the weight of the sinker by varying the weight of the disks themselves.

An important feature in the construction of my sinker is that disks of soft rubber E', or other elastic material, Fig. 5, may be placed between the two parts B B', for the purpose of lessening the frictional hold on the line, so that the sinker, when closed, may be adjusted up or down thereon without unscrewing or opening its parts. To provide means for securing the edges of the elastic disks and to keep them from spreading, I hollow out or depress to a suitable depth the face of each hemisphere, as at $g$ $h$, Figs. 7 and 9. This construction makes a neater joint when the parts B B' are screwed together, hiding the edges of the disks from sight. Should it be deemed advisable, but one of the said hemispheres may be depressed, the other or opposite one remaining flat or concave, as the case may require.

It is evident that a line firmly pressed between two elastic surfaces will form of itself a depression or groove therein sufficiently deep to allow the sinker to move upon pressure without freeing itself from the line, which could not be done were it held between two rigid surfaces. In order, however, to further facilitate the operation of moving the sinker without the trouble of unscrewing it, I cause a groove of greater or less depth to be made across the face of the elastic disk E², as shown in Fig. 6 at $f$. This groove $f$ is to receive the line, and when the sinker has been screwed together the latter can be moved up or down thereon at will, remaining at any desired point. In order to receive the grooved disk E', a corresponding depression must be made in one of the hemispheres, as shown at $g$ $h$, Figs. 7 and 9.

When gut leaders are used in angling, a sinker constructed upon this principle could not injure the fiber of the gut or impair its strength, as is the case with split shot or other kinds where hammering or looping is necessary to fasten it. In my device the gut or line running straight and lying on a smooth yielding surface is relieved from all tendency toward abrasion or strain.

When used in places where the sinker is liable to get fastened between rocks or other obstructions beneath the water, it should be fixed to the line with just enough tension to hold it gently thereon, in which case the line or leader could be pulled free of it, when caught, without the loss of hook, line, or lure.

The principle involved in my invention can be readily applied to a body of less specific gravity than is required in a sinker. By substituting cork, wood, celluloid, or any other light material for metal, an excellent float can be made, in which case it may be spherical in form, or substantially so, and the hemispheres hollowed out to a mere shell, the better to promote buoyancy, Fig. 9.

To attach the sinker, unscrew the parts B B' sufficiently to allow the line to pass between them and to rest against the stem $c$; then screw the parts down upon the line F; vice versa to remove it.

What I claim as a new article of manufacture and use, and for which I ask Letters Patent, is—

1. A line-sinker composed of a plurality of separable parts, as shown, one of which is provided with a stem having a depressed portion for the line, and the other with an opening to receive said stem, whereby the parts are united.

2. A line-sinker composed of separable parts, one of which is provided with a threaded stem having a depressed portion for the line, and the other with an opening to receive said stem, as and for the purpose set forth.

3. A line-sinker consisting of the substantially semi-spherical parts B B', having abutting clamping-surfaces formed by their inner faces, and a stem uniting said parts, substantially as described.

4. A line-sinker consisting of the substantially semi-spherical parts B B', having abutting clamping-surfaces formed by their inner faces, and a screw-threaded stem uniting said parts, substantially as described.

5. A line-sinker comprising the semi-spherical part B, threaded stem $c$, provided with a depressed portion $c'$, and the semi-spherical part B', provided with a threaded opening for said stem.

6. In a fishing-tackle or analogous device, the combination, with the line, of an adjustable sinker composed of separate parts adjustable with relation to each other for clamping the line between their inner faces, whereby the sinker is held in position by frictional contact, as set forth.

7. In a fishing-tackle, the combination of a sinker composed of semi-spherical parts united by a central stem, a line, and interposed elastic material, the latter impinging upon the line, as and for the purpose set forth.

8. A line-sinker comprising two roughened semi-spherical parts, one of which has a threaded stem and the other a corresponding opening to unite them, said stem being provided with a line-receiving depression, in combination with a line.

9. A line-sinker comprising two semi-spherical parts, means for uniting them, and interposed elastic disks, in combination with a line.

10. A line-sinker consisting of two or more parts movably united together, with abutting clamping-faces, and a depression in one or both of said faces for the reception of washers or disks, as and for the purpose set forth.

WM. H. TUFTS.

Witnesses:
JAMES F. DARTT,
A. W. BINGHAM.